(12) United States Patent　　(10) Patent No.: US 12,235,186 B2
Rahman et al.　　(45) Date of Patent: Feb. 25, 2025

(54) METHOD OF EVALUATING AIRCRAFT ENGINE COMPONENTS FOR COMPLIANCE WITH FLOW REQUIREMENTS

(71) Applicant: PRATT & WHITNEY CANADA CORP., Longueuil (CA)

(72) Inventors: Mizanur Rahman, Saint-Hubert (CA); Bruno Rivest, St-Mathieu-de-Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 132 days.

(21) Appl. No.: 17/491,993

(22) Filed: Oct. 1, 2021

(65) Prior Publication Data

US 2023/0106089 A1　　Apr. 6, 2023

(51) Int. Cl.
　　*G01M 15/14*　　(2006.01)
　　*F02K 3/06*　　(2006.01)
　　(Continued)

(52) U.S. Cl.
　　CPC .............. *G01M 15/14* (2013.01); *F02K 3/06* (2013.01); *F23R 3/002* (2013.01); *G06F 30/20* (2020.01);
　　(Continued)

(58) Field of Classification Search
　　None
　　See application file for complete search history.

(56) References Cited

U.S. PATENT DOCUMENTS

| | | | | |
|---|---|---|---|---|
| 4,534,216 A | * | 8/1985 | Fasano | G01M 9/04 |
| | | | | 73/147 |
| 8,061,988 B1 | * | 11/2011 | Rawlings | G06F 30/23 |
| | | | | 416/97 R |

(Continued)

OTHER PUBLICATIONS

"Discharge Coefficient" Nov. 18, 2016 downloaded from https://web.archive.org/web/20230000000000*/https://en.wikipedia.org/wiki/Discharge_coefficient. on Mar. 31, 2023 (Year: 2016).*

(Continued)

*Primary Examiner* — Michael J Dalbo
*Assistant Examiner* — Denise R Karavias
(74) *Attorney, Agent, or Firm* — NORTON ROSE FULBRIGHT CANADA LLP

(57) ABSTRACT

A method of evaluating compliance of a component of an aircraft engine with flow requirements has: obtaining experimental data from experimental testing on a prototype of the component; obtaining a digitized model of a production model of the component, the digitized model including digitized apertures having geometrical data corresponding to that of apertures defined in the production model; computing a nominal mass flow rate through the digitized apertures using the geometrical data and flow parameters from the experimental data; correcting the nominal mass flow rate of the digitized model to obtain a computed mass flow rate of the production model; and assigning at least one parameter to the production model, the at least one parameter indicative of installation approval of the production model of the component for installation on the aircraft engine when the computed mass flow rate is determined to be within a prescribed range of the flow requirements.

7 Claims, 6 Drawing Sheets

(51) Int. Cl.
*F23R 3/00* (2006.01)
*G06F 30/20* (2020.01)
(52) U.S. Cl.
CPC .. *F05D 2220/323* (2013.01); *F05D 2270/306* (2013.01); *F05D 2270/44* (2013.01)

(56) References Cited

U.S. PATENT DOCUMENTS

| | | | |
|---|---|---|---|
| 8,706,461 | B1 | 4/2014 | Cary et al. |
| 9,760,986 | B2 | 9/2017 | Ramamurthy et al. |
| 10,678,206 | B2 | 6/2020 | Quitter et al. |
| 11,281,821 | B2 * | 3/2022 | Snyder ................. G01M 15/14 |
| 2009/0180939 | A1 * | 7/2009 | Hagen ...................... F23R 3/28 |
| | | | 422/600 |
| 2015/0072432 | A1 * | 3/2015 | Tallman ................. G01N 21/84 |
| | | | 436/2 |
| 2015/0161778 | A1 * | 6/2015 | Henderkott ............ F01D 17/24 |
| | | | 348/129 |
| 2015/0370233 | A1 * | 12/2015 | Karpman ................... F02C 7/26 |
| | | | 700/275 |
| 2021/0102859 | A1 * | 4/2021 | Koonankeil ............ F01D 5/186 |
| 2021/0209265 | A1 * | 7/2021 | Pham ..................... G01M 15/14 |

OTHER PUBLICATIONS

Qpedia "Discharge Coefficient in Flow Calculation and Measurement" Feb. 2008 downloaded from https://www.studocu.com/row/document/jamaa%D8%A9-alkahr%D8%A9/feasibility-study/qpedia-feb08-discharge-coefficient-in-flow-calculation-and-measurement/42690689 (Year: 2008).*

Tomaszewski Adam et al: "Experimental and numerical analysis of multi-hole orifice flow meter: Investigation of the relationship between pressure drop and mass flow rate", Sensors, vol. 20, No. 24, Dec. 1, 2020, p. 7281.

European Search Report issued on Feb. 24, 2023 for corresponding application No. 22199242.3.

* cited by examiner

US 12,235,186 B2

METHOD OF EVALUATING AIRCRAFT ENGINE COMPONENTS FOR COMPLIANCE WITH FLOW REQUIREMENTS

TECHNICAL FIELD

The present disclosure relates generally to aircraft engines and, more particularly, to systems and methods to perform air flow testing of components of such aircraft engines.

BACKGROUND

Certain parts of an aircraft engine, such as combustor liners for example, have holes defined therethrough. Those holes are carefully sized to allow a desired amount of air to flow through them. Typically, each part manufactured with such holes goes through extensive experimental testing to ensure that the dimensions of the holes, and the air flow flowing therethrough, are within specified tolerances. This process can be time consuming and costly. Improvements are therefore sought.

SUMMARY

In one aspect, there is provided a method of evaluating compliance of a component of an aircraft engine with flow requirements through apertures defined through the component, the method comprising: obtaining experimental data from experimental testing on a prototype of the component, the experimental testing including flowing a flow of a fluid through apertures of the prototype; obtaining a digitized model of a production model of the component, the digitized model including digitized apertures having geometrical data corresponding to that of apertures defined in the production model; computing a nominal mass flow rate through the digitized apertures using the geometrical data and flow parameters from the experimental data; correcting the nominal mass flow rate of the digitized model using the experimental data to obtain a computed mass flow rate of the production model; and assigning at least one parameter to the production model, the at least one parameter indicative of installation approval of the production model of the component for installation on the aircraft engine when the computed mass flow rate is determined to be within a prescribed range of the flow requirements.

The method as defined above and described herein may also include one or more of the following features, in whole or in part, and in any combination.

In some embodiments, the computing of the nominal mass flow rate through the apertures of the component includes: calculating a total flow passage area of the flow through the digitized apertures of the component from the digitized model; and computing the nominal mass flow rate with:

$$q_m = C_d A_{total} \sqrt{2\Delta P \rho}$$

where $q_m$ is the nominal mass flow rate, $C_d$ is a coefficient of discharge obtained from the experimental data, $A_{total}$ is the total flow passage area obtained from the geometrical data of the digitized model, $\rho$ is a density of the fluid flown through the apertures of the prototype during the experimental testing and taken upstream of the apertures of the prototype, and $\Delta p$ is a pressure differential between pressures respectively upstream and downstream of the apertures of the prototype during the experimental testing.

In some embodiments, the obtaining of the experimental data includes obtaining the coefficient of discharge from the experimental data, an experimental mass flow rate through the apertures of the prototype from the experimental data, and a reference nominal mass flow rate through the apertures of the prototype, the method comprising computing a correction factor corresponding to a ratio of the reference nominal mass flow rate to the experimental mass flow rate.

In some embodiments, the computing of the mass flow rate through the apertures of the component comprises multiplying the correction factor by the nominal mass flow rate through the apertures of the component.

In some embodiments, the determining of the total flow passage area includes multiplying a number of the apertures by a mean flow passage area of the apertures.

In some embodiments, the method includes determining the mean flow passage area by: determining, for each of the apertures of the component, maximum diameters of cylinders able to be inserted into each of the apertures; computing an average of the maximum diameters; and calculating the mean flow passage area by calculating an area of a circle from the average of the maximum diameters.

In some embodiments, the method includes computing of the coefficient of discharge with:

$$C_d = \frac{4 q_{rig} \sqrt{D^4 - d^4}}{\epsilon \pi D^2 d^2 \sqrt{2\Delta p \rho}},$$

where $q_{rig}$ is an experimental mass flow rate from the experimental data, D is a diameter of a conduit feeding the flow to the apertures of the prototype during the experimental testing, d is a mean diameter of maximum diameters of cylinders able to fit in the apertures of the prototype, and is an expansion coefficient calculated as follows:

$$\epsilon = 1 - \left[\left(0.351 + 0.256\beta^4 + 0.93\beta^8\right)\left(1 - \gamma\frac{p - \Delta p}{p}\right)\right]$$

where p is a pressure of the flow upstream of the apertures of the prototype, $\gamma$ is a specific heat ratio of the fluid, and $\beta$ is a ratio of the mean diameter (d) to the diameter (D) of the conduit.

In some embodiments, the obtaining of the reference nominal mass flow rate through the apertures of the prototype includes: calculating a total flow passage area of the flow through the apertures of the prototype from a digitized model of the prototype; and computing the reference nominal mass flow rate with:

$$q_m = C_d A_{total} \sqrt{2\Delta P \rho}$$

where $q_m$ is the reference nominal mass flow rate, Ca is the coefficient of discharge obtained from the experimental data, $A_{total}$ is the total flow passage area of the apertures of the prototype, $\rho$ is the density of the fluid flown through the apertures of the prototype and taken upstream of the apertures of the prototype, and $\Delta p$ is a pressure differential between pressures respectively upstream and downstream of the apertures of the prototype.

In some embodiments, the component is a compressor diffuser, a heat shield, a turbine airfoil, or a combustor liner.

In some embodiments, the method includes conducting the experimental testing on the prototype to obtain the experimental data.

In some embodiments, the method includes marking the production model of the component as non-airworthy for installation on the aircraft engine when the computed mass flow rate is determined to be outside the prescribed range of the flow requirements.

In another aspect, there is provided a system for evaluating compliance of a component of an aircraft engine with flow requirements through apertures defined through the component, the system comprising: a processing unit and computer-readable medium operatively connected to the processing unit and having instructions stored thereon executable by the processing unit for: receiving experimental data from experimental testing on a prototype of the component, the experimental testing including flowing a flow of a fluid through apertures of the prototype; receiving a digitized model of a production model of the component, the digitized model including digitized apertures having geometrical data corresponding to that of apertures defined in the production model; computing a nominal mass flow rate through the digitized apertures using the geometrical data; correcting the nominal mass flow rate of the digitized model using the experimental data to obtain a computed mass flow rate of the production model; and assigning at least one parameter to the production model, the at least one parameter indicative of installation approval of the production model of the component for installation on the aircraft engine when the computed mass flow rate is determined to be within a prescribed range of the flow requirements.

The system as defined above and described herein may also include one or more of the following features, in whole or in part, and in any combination In some embodiments, the computing of the nominal mass flow rate through the apertures of the component includes: calculating a total flow passage area of the flow through the digitized apertures of the component from the digitized model; and computing the nominal mass flow rate with:

$$q_m = C_d A_{total} \sqrt{2\Delta P \rho}$$

where $q_m$ is the nominal mass flow rate, $C_d$ is a coefficient of discharge obtained from the experimental data, $A_{total}$ is the total flow passage area obtained from the geometrical data of the digitized model, $\rho$ is a density of the fluid flown through the apertures of the prototype during the experimental testing and taken upstream of the apertures of the prototype, and $\Delta p$ is a pressure differential between pressures respectively upstream and downstream of the apertures of the prototype during the experimental testing.

In some embodiments, the obtaining of the experimental data includes obtaining the coefficient of discharge from the experimental data, an experimental mass flow rate through the apertures of the prototype from the experimental data, and a reference nominal mass flow rate through the apertures of the prototype, the method comprising computing a correction factor corresponding to a ratio of the reference nominal mass flow rate to the experimental mass flow rate.

In some embodiments, the computing of the mass flow rate through the apertures of the component comprises multiplying the correction factor by the nominal mass flow rate through the apertures of the component.

In some embodiments, the determining of the total flow passage area includes multiplying a number of the apertures by a mean flow passage area of the apertures.

In some embodiments, the method includes determining the mean flow passage area by: determining, for each of the apertures of the component, maximum diameters of cylinders able to be inserted into each of the apertures; computing an average of the maximum diameters; and calculating the mean flow passage area by calculating an area of a circle from the average of the maximum diameters.

In some embodiments, the method includes computing of the coefficient of discharge with:

$$C_d = \frac{4 q_{rig} \sqrt{D^4 - d^4}}{\epsilon \pi D^2 d^2 \sqrt{2\Delta p \rho}},$$

where $q_{rig}$ is an experimental mass flow rate from the experimental data, D is a diameter of a conduit feeding the flow to the apertures of the prototype during the experimental testing, d is a mean diameter of maximum diameters of cylinders able to fit in the apertures of the prototype, and is calculated as follows:

$$\epsilon = 1 - \left[(0.351 + 0.256\beta^4 + 0.93\beta^8)\left(1 - \gamma \frac{p - \Delta p}{p}\right)\right]$$

where p is a pressure of the flow upstream of the apertures of the prototype, $\gamma$ is a specific heat ratio of the fluid, and $\beta$ is a ratio of the mean diameter (d) to the diameter (D) of the conduit.

In some embodiments, the obtaining of the reference nominal mass flow rate through the apertures of the prototype includes: calculating a total flow passage area of the flow through the apertures of the prototype from a digitized model of the prototype; and computing the reference nominal mass flow rate with:

$$q_m = C_d A_{total} \sqrt{2\Delta P \rho}$$

where $q_m$ is the reference nominal mass flow rate, $C_d$ is the coefficient of discharge obtained from the experimental data, $A_{total}$ is the total flow passage area of the apertures of the prototype, $\rho$ is the density of the fluid flown through the apertures of the prototype and taken upstream of the apertures of the prototype, and $\Delta p$ is a pressure differential between pressures respectively upstream and downstream of the apertures of the prototype.

In some embodiments, the component is a compressor diffuser, a heat shield, a turbine airfoil, or a combustor liner.

BRIEF DESCRIPTION OF THE DRAWINGS

Reference is now made to the accompanying figures in which.

DETAILED DESCRIPTION

Figure 1:
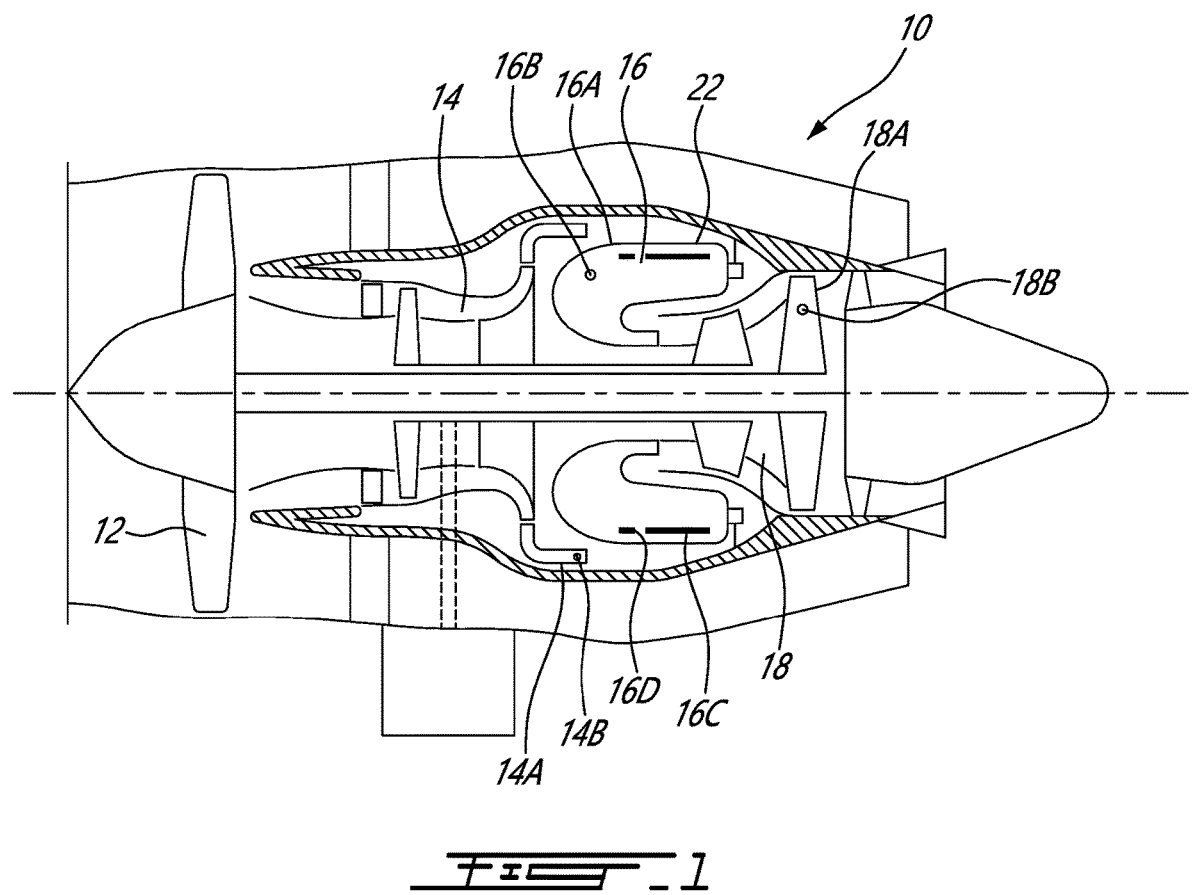
FIG. 1 is a schematic cross sectional view of an exemplary aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. It will be appreciated that the principles of the present disclosure may apply to any suitable aircraft engines such as turbofan, turboshaft, turboprop, and so on.

The gas turbine engine 10 includes a plurality of parts that define apertures through them for allowing a flow of a fluid (e.g., air) for cooling components, pressurizing seals, bleeding air, providing air for combustion, or other purposes. For instance, the combustor 16 includes a combustor liner 16A that may define a plurality of liner apertures 16B (only one illustrated for clarity) therethrough. The liner apertures 16B are used to allow air from the compressor section 14 to flow through the combustor liner 16A into a combustion chamber of the combustor 16. Heat shields 16C, which may be located within the combustor 16, may further have apertures 16D therethrough for film cooling and/or impingement cooling and so on. The compressor section 14 has a diffuser 14A, which may also define apertures 14B (only one shown) therethrough. These apertures may be used to bleed air from the compressor section 14. The turbine section 18 includes airfoils 18A of either blades or vanes, the airfoils may define aperture 18B for cooling of the airfoils 18A.

These apertures are often manufactured with laser drilling and, in some cases, they are coated with a heat-resistant coating or any other appropriate coating. The laser drilling and/or the coating may change the shape of peripheral walls bounding the apertures. This change of shape may affect a mass flow rate flowing through the apertures. An exemplary shape of an aperture being coated and/or laser drilled is shown schematically with dashed lines in FIG. 3. As one can appreciated by looking at FIG. 3, the profile of the aperture may deviate from a purely cylindrical hole. Therefore, each of the above-mentioned aircraft engine parts are subjected to extensive experimental flow testing to establish whether or not they are compliant with flow requirements.

Figure 2:
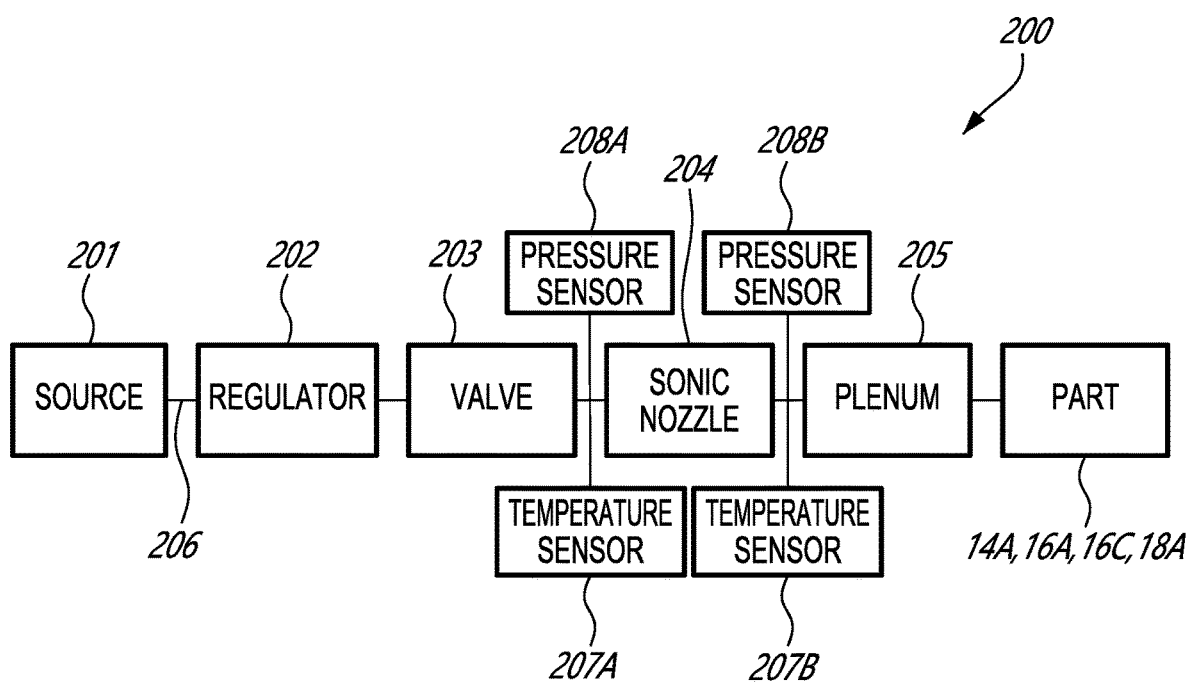
FIG. 2 is a schematic view of an exemplary experimental testing rig.
Figure 3:
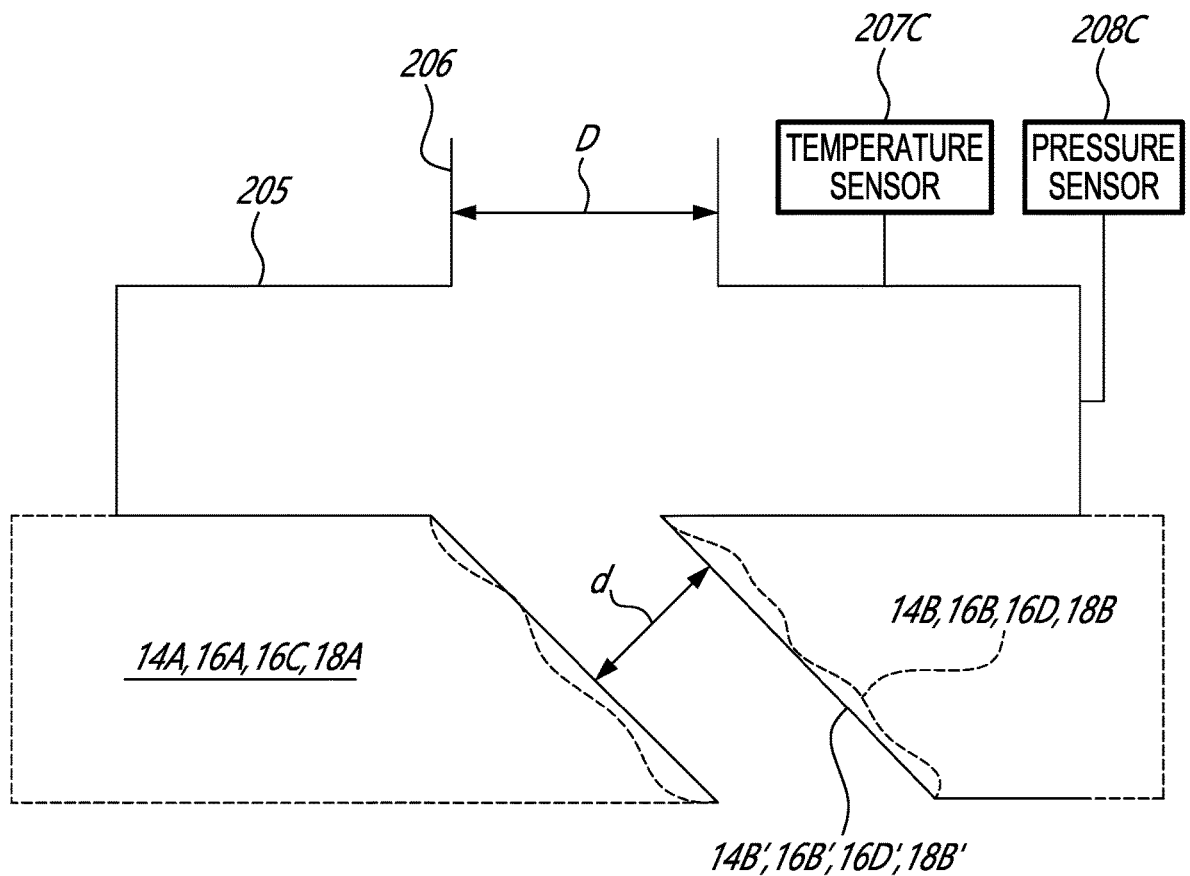
FIG. 3 is a schematic view of a portion of the exemplary testing rig coupled with an aircraft engine component being test.

A typical experimental flow testing bench or rig 200 is shown schematically on FIG. 2 and includes a source of a fluid, which is typically air, 201, a regulator 202 for controlling a mass flow rate supplied from the source of ambient air 201, a valve 203, a sonic nozzle 204, and a plenum 205. The aircraft engine component is pneumatically connected to the plenum 205 to undergo testing. A conduit 206 fluidly connects the source 201 to the plenum 205. A first temperature sensor 207A and a first pressure sensor 208A may be operatively connected to the air conduit 206 upstream of the sonic nozzle 204. A second temperature sensor 207B and a second pressure sensor 208B may be operatively connected to the air conduit 206 downstream of the sonic nozzle 204 and upstream of the plenum 205 relative to a flow of the fluid flowing from the source 201 to the plenum 205. As shown in FIG. 3, the conduit 206 that is pneumatically connected to the plenum 205 has a diameter D that is different than a diameter d of the apertures 14A, 16A, 16D, 18A defined through the aircraft engine component being tested. A third temperature sensor 207C and a third pressure sensor 208C may be operatively connected to the plenum 205 for measuring a pressure and temperature of the fluid (e.g., air) being injected into the apertures. It will be appreciated that, although only one aperture is shown in FIG. 3, the plenum 205 is designed to simultaneously inject the flow through a plurality of the apertures of the aircraft engine component being tested. More detail about the diameter d are presented herein below.

Since each flow bench might be used for various types of parts, a diameter of the sonic nozzle 204 may be varied to have different mass flow rate going through the sonic nozzle 204. The pressure and temperature of the flow coming out of the sonic nozzle 204 is being measured. The mass flow rate through the part is being measured. The third pressure sensor 208C is used to measure the air pressure of the flow prior to pass through the part.

The rig 200 may use specific fixtures, nozzle with specific diameters (e.g., 0.085", 0.125", 0.250", 0.350", 0.500" and so on) and an operator with sufficient knowledge on the flow bench and the flow characteristics operates the rig 200. Each sonic nozzle 204 being used must be calibrated on a regular basis (usually every 6 months) by an expert. The pressure and temperature sensors must be also calibrated at the same frequency. Depending on the design requirements, the flow may be based on constant pressure or constant mass-flow rate to verify the conformity of the part. Leak tests may have to be performed to ensure that the rig 200 is operating as it should. A master part test may have to be performed to corroborate the results and confirm that the rig 200 is adequately calibrated. The production part (e.g., combustor liner, etc) may then undergo flow-tests and checked for design requirements and approval.

The process therefore comprises of a plethora of steps from multiple organization (for flow rig calibration), expert personnel and logistics around these processes. This process is highly resource intensive and expensive. The method described in the current disclosure aims to at least partially alleviate some of the aforementioned drawbacks.

Typically, a plurality of the aircraft engine components, such as the combustor liner 16A, the heat shields, 16C, the airfoils 18A, the diffusers 14A and so on are manufactured so that more than one gas turbine engine 10 may be produced. As explained above, all of these components may have to undergo extensive experimental flow testing to ensure compliance with flow requirements. For instance, it may be important to determine that the apertures 16B through the combustor liner 16A allow the prescribed mass flow rate therethrough for proper operation of the gas turbine engine 10.

The method described herein proposes to perform the experimental flow testing for a first instance of a specific aircraft engine component (e.g., a first combustor liner of a series of combustor liners). This first instance may be referred to as a prototype of the specific aircraft engine component, however it is to be understood that this prototype could in certain embodiments in fact be a first production model. The second, third, and subsequent instances (e.g., second combustor liner, third combustor liner, etc.) of the same aircraft engine component, which are expected to be substantially identical to one another but for small deviations due to coatings and/or manufacturing tolerances as explained above, may be tested numerically to ensure compliance with the flow requirements of that specific aircraft engine component. These subsequent instances may be referred to as production models of the aircraft engine component, since they are manufactured with the intent of being installed on aircraft engines should they be compliant with the flow requirements. However, it is to be understood that in certain embodiments, the second, third and subsequent instances of the manufactured component may be early-stage test parts, with subsequent instances of the produced part being validated in a similar manner and implemented in full-scale production. Hence, these second, third, and subsequent instances may not undergo extensive experimental testing. The numerical testing process, which will be described below, may use some experimental data gathered from the experimental flow testing of the prototype to derive a computed mass flow rate through the one or more apertures defined through a subsequent instance of the component. This computed mass flow rate may then be used to determine whether or not the component meets its flow requirements. If so, the component may be installed on an aircraft engine. If not, the component may either be send back to undergo further manufacturing (e.g., milling, drilling, etc) or simply recycled or discarded.

Figure 4:
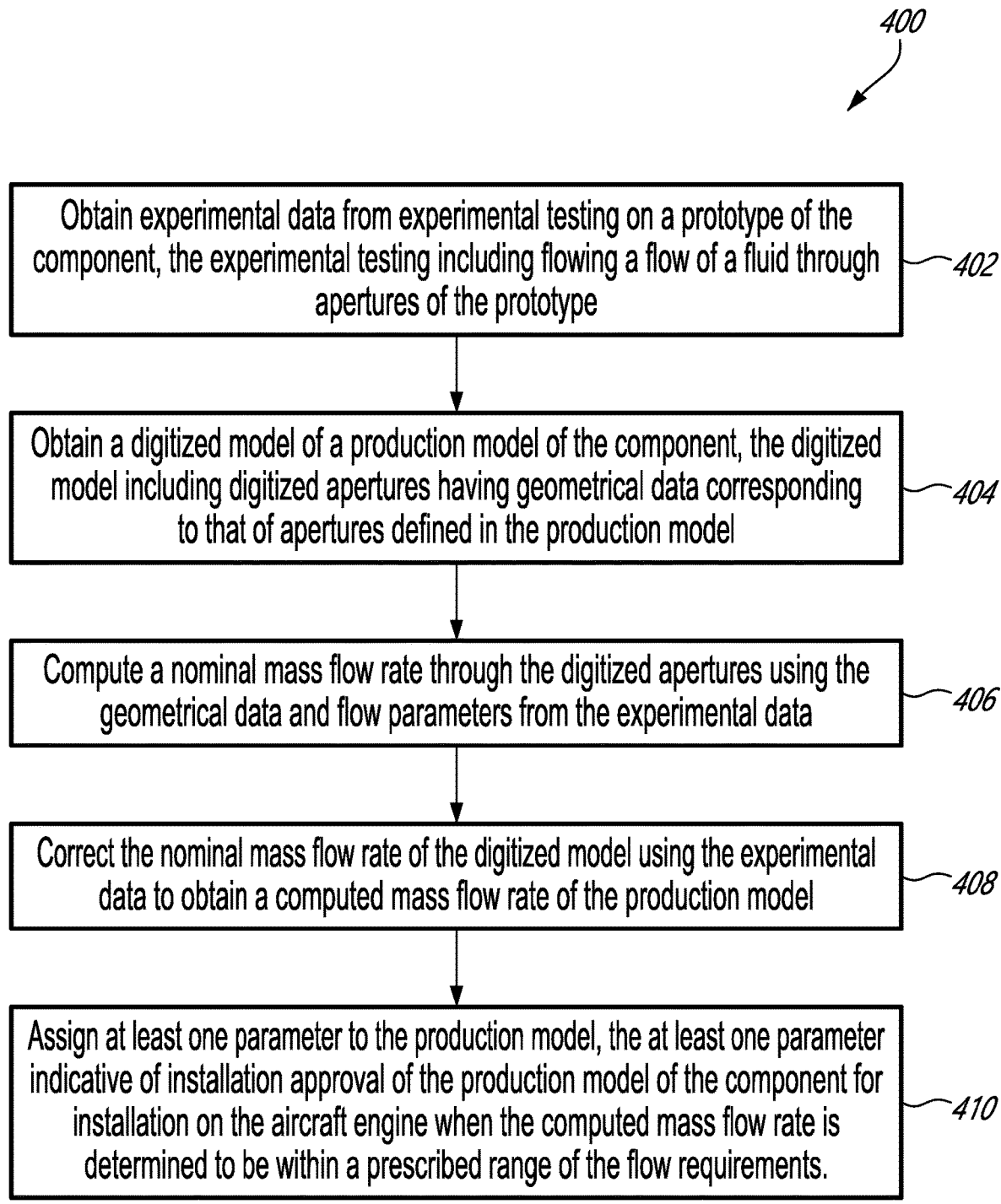
FIG. 4 is a flowchart illustrating steps of a method of evaluating an aircraft engine component for compliance with flow requirements.

Referring now to FIG. 4, a method of evaluating compliance of a component of the engine 10 for compliance with flow requirements through apertures defined therethrough is shown at 400. The method 400 includes obtaining experimental data from experimental testing on a prototype of the component at 402, the experimental testing including flowing a flow of a fluid through apertures of the prototype. Then, a digitized model of a production model of the component is obtained at 404. The digitized model includes digitized apertures having geometrical data corresponding to that of apertures defined in the production model. More detail about the geometrical data are presented below with reference to FIG. 5. A nominal mass flow rate through the digitized apertures may be computed using the geometrical data and the fluid flow characteristics (e.g., pressure, temperature, density of the fluid, etc.) at 406. Then, the nominal mass flow rate of the digitized model may be corrected using the experimental data to obtain a computed mass flow rate of the production model at 408. And, at least one parameter may be assigned to the production model, the at least one parameter indicative of installation approval of the production model of the component for installation on the aircraft engine when the computed mass flow rate is determined to be within a prescribed range of the flow requirements at 410. In some cases, the production model of the component may be marked as non-airworthy for installation on the aircraft engine when the computed mass flow rate is determined to be outside the prescribed range of the flow requirements. The method 400 may include conducting the experimental testing. The digitized model may be obtained by scanning the components with any suitable device. The digitized model may be fed to a metrology software able to extract data about the scanned component (e.g., diameters of apertures, detecting apertures, and so on).

If the component complies with the flow requirements, the component may be sent to be installed in an engine. If the component does not comply with the flow requirements, the component may be recycled, repaired, adjusted, or simply discarded.

Consequently, each of the subsequent instances of the engine component (e.g., second combustor liner, third combustor liner, etc) may be evaluated for compliance with flow requirements without going through extensive experimental testing. This may offer substantial cost and time savings during the manufacturing of the different aircraft engine components.

The step 406 of the computing of the nominal mass flow rate through the apertures of the component may include calculating a coefficient of discharge $C_d$ from the experimental data gathered from the experimental testing of the prototype, and a total flow passage area of the flow through the apertures of the prototype from a digitized model of the prototype. At which point, a reference nominal mass flow rate through the apertures of the prototype may be derived with the following equation:

$$q_m = C_d A_{total}\sqrt{2\Delta P \rho}$$

where $q_m$ is the reference nominal mass flow rate, $C_d$ is a coefficient of discharge obtained from the experimental data, $A_{total}$ is the total flow passage area obtained from the geometrical data of a digitized model of the prototype, $\rho$ is the density of the fluid flown through the apertures of the prototype during the experimental testing and taken upstream of the apertures of the prototype, and $\Delta p$ is a pressure differential between pressures respectively upstream and downstream of the apertures of the prototype.

In the embodiment shown, the step 402 of obtaining the experimental data may include obtaining the coefficient of discharge $C_d$ from the experimental data and an experimental mass flow rate through the apertures of the prototype from the experimental data. The computing of the coefficient of discharge $C_d$ may be done using the following equation:

$$C_d = \frac{4q_{rig}\sqrt{D^4 - d^4}}{\epsilon\pi D^2 d^2 \sqrt{2\Delta pp}}$$

where $q_{rig}$ is the experimental mass flow rate measured from the experimental data, D is the diameter of the conduit 206 (FIG. 3) feeding the flow to the apertures of the prototype during the experimental testing, d is the mean diameter of maximum diameters of cylinders able to fit in the apertures of the prototype as detailed above, and is an expansion coefficient, which accounts for gas compressibility effects and corrects the fluid density, calculated as follows:

$$\epsilon = 1 - \left[(0.351 + 0.256\beta^4 + 0.93\beta^8)\left(1 - \gamma\frac{p - \Delta p}{p}\right)\right]$$

where p is a pressure of the flow upstream of the apertures obtained from the experimental testing, $\gamma$ is a specific heat ratio of the fluid (e.g., 1.4 for air), and $\beta$ is a ratio of the mean diameter d to the diameter D of the conduit.

Referring back to FIG. 3, the determining of the total flow passage area includes multiplying a number of the apertures (e.g., 40) by a mean flow passage area of the apertures. That is, the apertures defined through the aircraft engine components may present some variations and irregularities as explained above. An exemplary shape of a peripheral wall of one of the apertures is shown with a dashed line in FIG. 3. These variations are amplified for better understanding. These variations may be caused by the manufacturing process of these components. For instance, the apertures may be drilled with a laser and/or a coating may be applied on the components. The laser drilling and/or coating may create these deviations from a purely cylindrical aperture as exhibited in FIG. 3. These deviations may also have an impact on the flow rate flowing through the apertures as explained above.

To obtain the mean diameter d, the method 400 includes the calculation of a maximum diameter d of a cylinder 14B', 16B', 16D', 18B' (FIG. 3) that is able to fit inside each of the apertures 14B, 16B, 16D, 18B. This maximum diameter may vary from aperture to aperture. If a cylinder having a diameter greater than the maximum diameter, it would not be able to extend throughout the aperture; it would be blocked by crests or other features defined by the peripheral wall bounding the aperture. The maximum diameter may correspond to a throat of the aperture, although the aperture are not necessarily shaped with convergent-divergent shape. Nevertheless, the smallest cross-sectional area of the aperture may be the limiting factor to the flow flowing through the aperture.

Figure 5:
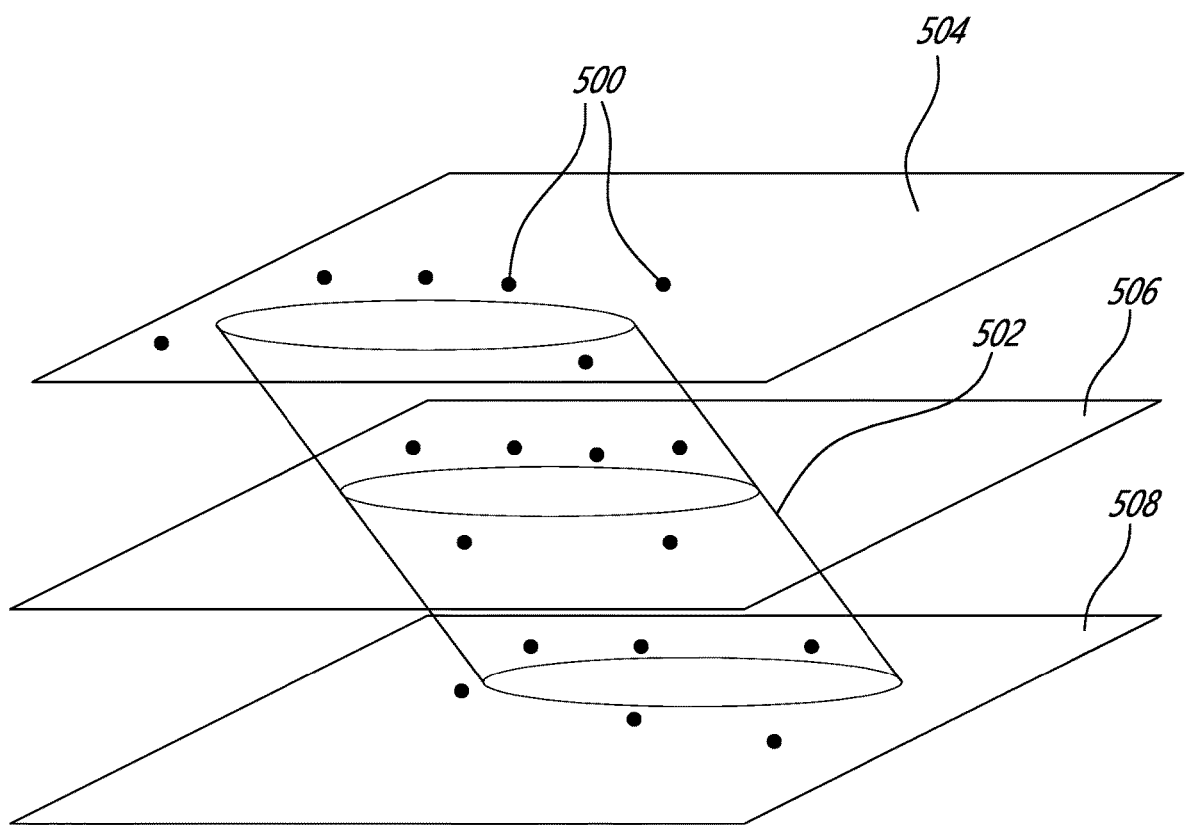
FIG. 5 is a schematic representation of a digitized model of an aircraft engine component.

Referring also to FIG. 5, the digitized model of any of the aircraft engine component may include a plurality of data points, which are represented by the markers 500 on FIG. 5. The determining of the maximum diameter of a cylinder that fit insides each of the apertures may include generating a first cylinder representation 502 from the digitized model. The cylinder representation 502 may be created by fitting part of a cylindrical surface through some of the data points 500. The part of the cylindrical surface fitted through the data points 500 may then be used to derive a radius (or diameter), an orientation (e.g., i, j, k) and a location of the cylindrical representation 502. Cylinder representations 502 may have a substantially circular cross-sectional profile. The method of computing the cylindrical representation and the associated diameter is presented in U.S. patent application Ser. No. 16/920,868 filed on Jul. 6, 2020, the entire contents of which are incorporated herein by reference.

In some embodiments, a plurality of planes 504, 506, 508 may be obtained from the data points 500. The apertures may be re-created from the data points 500 and for each of the planes 504, 506, 508. Once the apertures are re-created, algorithm may be used to determine the maximum diameter of a cylinder 502 that may fit through them.

Once the maximum diameters of each of the apertures is determined, an average of the maximum diameters may be computed. This average diameter may be used to calculate the mean flow passage area by computing the area of a circle from the average diameter d. And, the total flow passage area may be computed by multiplying the number of apertures by the mean flow passage area.

The method 400 may then include computing a correction factor corresponding to a ratio of the reference nominal mass flow rate calculated above for the prototype to the experimental mass flow rate through the apertures of the prototype and measured from the experimental data. The correction factor is therefore obtained by dividing the reference nominal mass flow rate of the flow through the apertures of the prototype by the experimental mass flow rate through the same apertures of the prototypes, and which has been measured during the experimental testing. This correction factor therefore takes into account differences between simulations and actual experimental testing. These differences may be explained by complicated flow patterns of the flow flowing through the apertures, such as turbulence, secondary flows, friction, roughness of walls bounding the apertures, and so on. At step 408, the correcting of the nominal mass flow rate therefore include multiplying the correction factor by the nominal mass flow rate through the apertures of the component.

To determine the robustness of this method, a plurality of experimental tests were conducted. Namely, the pressure differential across the apertures was varied to create a variation in the measured mass flow rate through the apertures. For each respective pressure differentials, a nominal mass flow rate was computed and a correction factor was derived. It was observed that, for a given aircraft engine component (e.g., combustor liner), the correction factor remains substantially unchanged regardless of the mass flow rate flowing through the apertures. Moreover, the pressure differential across the apertures of the prototype was varied and the coefficient of discharge was measured for each of the pressure differentials. This showed that the equations for the nominal mass flow rate and for the coefficient of discharged are suitable.

The nominal mass flow rate of the component (e.g., second combustor liner of the series of combustor liners) may then be obtained by calculating the total flow passage area of the flow through the apertures of the component from the digitized model of the component as explained above. Then, the equation below may be used to compute the nominal mass flow rate $q_m$ through the apertures of the component:

$$q_m = C_d A_{total} \sqrt{2\Delta P \rho}$$

where $C_d$ is the coefficient of discharge obtained from the experimental data of the prototype as detailed above, $A_{total}$ is the total flow passage area of the apertures of the component, which is calculated using the method described above, $\rho$ is the density of the fluid flown through the apertures of the prototype and taken upstream of the apertures of the prototype, and $\Delta p$ is a pressure differential between pressures respectively upstream and downstream of the apertures of the prototype.

At which point, the step 406 of computing the mass flow rate through the apertures of the component includes multiplying the nominal mass flow rate $q_m$ of the component by the correction factor obtained from the experimental flow testing. Then, the computed mass flow rate may be compared with the range of the flow requirements to determine whether the component meets its flow requirements at the steps 408A, 408B.

The present disclosure illustrates a method to calculate the mass-flow through perforated aircraft engine components using the digitized part model. The method 400 also establish a correlation or correction factor between the actual airflow vs. expected or calculated airflow obtained by simulated model for each part number. Presently, each and every manufactured parts are undergoes airflow test in order to validate design conformity. The process is time consuming and required customized fixture and specialized personnel who experience on airflow test bench. This method 400 may allow the use of the digitized part model, which is readily available after certain operation such as coating or laser drilling operation, to establish an airflow mass discharge coefficient. This discharge coefficient and the digitized part is used to compute a correction factor. This correction factor is applied to calculate the mass flow rate of any give part of that specific part number. Henceforth, this method 400 may facilitate the avoidance of the logistics involves in the process of airflow evaluation. This method 400 may reduce the process cost, facilitate automation and improve stability since there are no human intervention may be required. The method 400 assumes that, for each component of the series of components, the flow requirements are consistent and that pressure and temperature differences and air density are being constant during the experimental flow testing.

The proposed method 400 may eliminate the use of airflow test bench and all the relevant processes, manpower and cost related to the flow test. The method 400 may not only facilitate the automation capability of a manufacturing cell but may also reduce the logistics behind it by optimizing the process and may eliminate human errors. The method may comprise the digitized part model obtain after the last operation before airflow (such as laser drilling, plasma coating, etc.). As a part of the standard inspection process, the manufactured part undergoes 3D scanning operation that collect the digitized model and processed in a metrology software. This method is use the readily available 3D scanned data of the part as an input hence no additional setup, fixture setting, equipment may be required. The digitized part model is processed in a metrology software using certain inspection algorithm and strategies.

Figure 6:
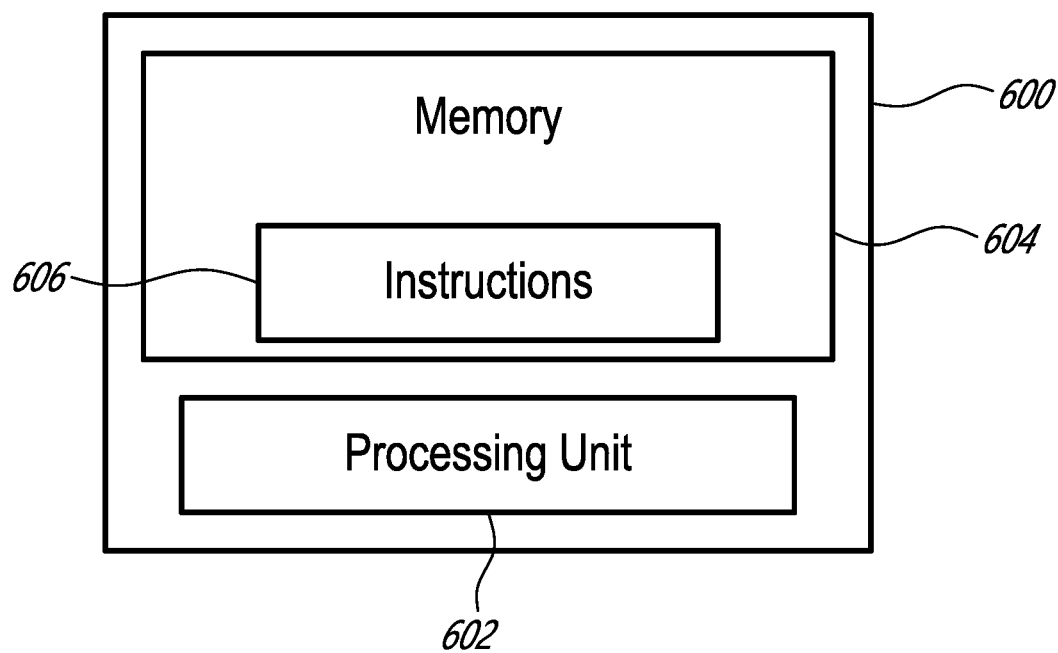
FIG. 6 is a schematic representation of a computing device able to perform the steps of the method of FIG. 4.

With reference to FIG. 6, an example of a computing device 600 is illustrated. For simplicity only one computing device 600 is shown but the system may include more computing devices 600 operable to exchange data. The computing devices 600 may be the same or different types of devices. The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 506 executable by processing unit 502.

The methods and systems for evaluating an aircraft engine component for compliance with flow requirements described herein may be implemented in a high level procedural or object oriented programming or scripting language, or a combination thereof, to communicate with or assist in the operation of a computer system, for example the computing device 600. Alternatively, the methods and systems for evaluating an aircraft engine component for compliance with flow requirements may be implemented in assembly or machine language. The language may be a compiled or interpreted language. Program code for implementing the methods and systems for evaluating an aircraft engine component for compliance with flow requirements may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for evaluating an aircraft engine component for compliance with flow requirements may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of evaluating compliance of a component of an aircraft engine with flow requirements through apertures defined through the component, the method comprising:
obtaining experimental data from experimental testing on a prototype of the component, the experimental testing including flowing a flow of a fluid through apertures of the prototype to obtain a coefficient of discharge ($C_d$) and an experimental mass flow rate through the apertures of the prototype, and including computing a reference nominal mass flow rate through digitized apertures of a digitized model of the prototype, including computing the coefficient of discharge with:

$$C_d = \frac{4 q_{rig} \sqrt{D^4 - d^4}}{e \pi D^2 d^2 \sqrt{2\Delta pp}},$$

where $q_{rig}$ is an experimental mass flow rate from the experimental data, D is a diameter of a conduit feeding the flow to the apertures of the prototype during the experimental testing, d is a mean diameter of maximum diameters of cylinders able to fit in the apertures of the prototype, and e is an expansion coefficient calculated as follows:

$$\epsilon = 1 - \left[ (0.351 + 0.256\beta^4 + 0.93\beta^8)\left(1 - \gamma\frac{p - \Delta p}{p}\right)\right]$$

where p is a pressure of the flow upstream of the apertures of the prototype, g is a specific heat ratio of the fluid, and b is a ratio of the mean diameter (d) to the diameter (D) of the conduit;
obtaining a digitized model of a production model of the component, the digitized model including digitized apertures having geometrical data corresponding to that of apertures defined in the production model;
computing a nominal mass flow rate through the digitized apertures of the digitized model of the production model using the geometrical data from the digitized model, flow parameters from the experimental data, and the coefficient of discharge from the experimental data, wherein the computing of the nominal mass flow rate includes:
calculating a total flow passage area of the flow through the digitized apertures of the component from the digitized model; and
computing the nominal mass flow rate with:

$q_m = C_d A_{total}\sqrt{2\Delta P\rho}$ where $q_m$ is the nominal mass flow rate, $C_d$ is the coefficient of discharge obtained from the experimental data, $A_{total}$ is the total flow passage area obtained from the geometrical data of the digitized model, $\rho$ is a density of the fluid flown through the apertures of the prototype during the experimental testing and taken upstream of the apertures of the prototype, and $D_p$ is a pressure differential between pressures respectively upstream and downstream of the apertures of the prototype during the experimental testing;
correcting the nominal mass flow rate of the digitized model using the experimental data to obtain a computed mass flow rate of the production model, the correcting of the nominal mass flow rate including multiplying the nominal mass flow rate by a ratio of the experimental mass flow rate to the reference nominal mass flow rate; and
one of:
installing the component in the aircraft engine upon determining that the computed mass flow rate is within a prescribed range of the flow requirements, and
discarding the component upon determining that the computed mass flow rate is outside the prescribed range of the flow requirements.

2. The method of claim 1, wherein the determining of the total flow passage area includes multiplying a number of the apertures by a mean flow passage area of the apertures.

3. The method of claim 2, comprising determining the mean flow passage area by:
determining, for each of the apertures of the component, maximum diameters of cylinders able to be inserted into each of the apertures;
computing an average of the maximum diameters; and
calculating the mean flow passage area by calculating an area of a circle from the average of the maximum diameters.

4. The method of claim 1, wherein the obtaining of the reference nominal mass flow rate through the apertures of the prototype includes:
calculating a total flow passage area of the flow through the digitized apertures of the prototype from the digitized model of the prototype; and
computing the reference nominal mass flow rate with:

$q_m = C_d A_{total}\sqrt{2\Delta P\rho}$ where $q_m$ is the reference nominal mass flow rate, $C_d$ is the coefficient of discharge obtained from the experimental data, $A_{total}$ is the total flow passage area of the apertures of the prototype, $\rho$ is the density of the fluid flown through the apertures of the prototype and taken upstream of the apertures of the prototype, and $D_p$ is a pressure differential between pressures respectively upstream and downstream of the apertures of the prototype.

5. The method of claim 1, wherein the component is a compressor diffuser, a heat shield, a turbine airfoil, or a combustor liner.

6. The method of claim 1, comprising conducting the experimental testing on the prototype to obtain the experimental data.

7. The method of claim 1, comprising marking the production model of the component as non-airworthy for installation on the aircraft engine when the computed mass flow rate is determined to be outside the prescribed range of the flow requirements.

* * * * *